(12) United States Patent
Stimek et al.

(10) Patent No.: US 12,047,676 B2
(45) Date of Patent: Jul. 23, 2024

(54) EXTERNALLY ATTACHABLE DEVICE TRIGGERING SYSTEM AND METHOD OF USE

(71) Applicant: WilliamsRDM, Inc., Fort Worth, TX (US)

(72) Inventors: Christopher M. Stimek, Fort Worth, TX (US); Eduardo M. Hinojosa, Fort Worth, TX (US); Donald W. Murray, Santo, TX (US)

(73) Assignee: WilliamsRDM, Inc., Fort Worth, TX (US)

( * ) Notice: Subject to any disclaimer, the term of this patent is extended or adjusted under 35 U.S.C. 154(b) by 327 days.

(21) Appl. No.: 17/031,672

(22) Filed: Sep. 24, 2020

(65) Prior Publication Data

US 2021/0099635 A1 Apr. 1, 2021

Related U.S. Application Data

(60) Provisional application No. 62/906,692, filed on Sep. 26, 2019.

(51) Int. Cl.
*H04N 7/18* (2006.01)
*H04N 23/60* (2023.01)
*H04N 23/66* (2023.01)

(52) U.S. Cl.
CPC ............ *H04N 23/66* (2023.01); *H04N 7/183* (2013.01); *H04N 7/188* (2013.01); *H04N 23/60* (2023.01)

(58) Field of Classification Search
None
See application file for complete search history.

(56) References Cited

U.S. PATENT DOCUMENTS

| | | | | |
|---|---|---|---|---|
| 5,495,288 A * | 2/1996 | Broady | ............ | G08B 13/19634 348/839 |
| 10,657,784 B1 * | 5/2020 | Gordon | .............. | G08B 13/1966 |
| 10,679,475 B1 * | 6/2020 | Parlin | ................. | F21V 23/0478 |
| 10,871,401 B1 * | 12/2020 | Parlin | .................... | G08B 13/19 |
| 10,965,914 B2 * | 3/2021 | D'Acquisto | .......... | F16M 13/022 |
| 2008/0151055 A1 * | 6/2008 | Elsemore | ............ | A01M 31/004 348/E7.086 |
| 2011/0102588 A1 * | 5/2011 | Trundle | ........... | G08B 13/19613 348/143 |
| 2015/0362172 A1 * | 12/2015 | Gabriel | ................... | F21V 11/16 348/151 |
| 2016/0189500 A1 * | 6/2016 | Kim | ................. | G08B 13/19608 386/223 |
| 2019/0236531 A1 * | 8/2019 | Adato | .................... | G06V 20/20 |

* cited by examiner

*Primary Examiner* — Twyler L Haskins
*Assistant Examiner* — Wesley J Chiu
(74) *Attorney, Agent, or Firm* — Foley & Lardner LLP (57) ABSTRACT

A sensor system includes a camera having a first sensor configured to trigger the camera to take a photograph, a trigger device configured to couple to the camera, and a remote sensor node. The trigger device includes a heat generating member (HGM) disposed adjacent to the first sensor, a receiving node communicatively coupled to the HGM, and a housing configured to house at least one of the heat generating member and the receiving node. The remote sensor node is communicatively coupled to the receiving node, and includes a second sensor configured to detect an object in the field of view of the camera.

20 Claims, 6 Drawing Sheets

EXTERNALLY ATTACHABLE DEVICE TRIGGERING SYSTEM AND METHOD OF USE

CROSS-REFERENCE TO RELATED APPLICATIONS

This application claims the benefit of and priority to co-pending U.S. Prov. Pat. App. No. 62/906,692, filed on Sep. 26, 2019, and entitled "Externally Attachable Device for Trail Camera Triggering," the disclosure of which is hereby incorporated by reference in its entirety.

TECHNICAL FIELD

This disclosure relates to sensor systems, and in particular, to systems and methods for remote triggering of devices.

BACKGROUND

Trail cameras are used to automatically take photographs of objects that move across the field of view. These trail cameras have a sensor configured to trigger a flash that can illuminate the objects for the camera. However, the sensor becomes less useful at a certain point when the subject is too far from the camera. For instance, the sensor may not detect movement even if the movement occurs within the camera's field of view. This can create inefficiencies or lost opportunities for the user needing to photograph those objects.

SUMMARY

This disclosure describes methods and systems for a sensor system. The sensor system provides a better sensing range for cameras, such as passive infrared triggered cameras. For example, the passive infrared triggered camera may be positioned remotely from the sensors and configured to respond to receive a signal from the remote sensors, thus utilizing a greater range of the camera's field of view to better photograph an object.

According to a first embodiment, a sensor system includes a camera having a first sensor configured to trigger the camera to take a photograph, a trigger device configured to couple to the camera, and a remote sensor node. The trigger device includes a heat generating member (HGM) disposed adjacent to the first sensor, a receiving node communicatively coupled to the HGM, and a housing configured to house at least one of the heat generating member and the receiving node. The first sensor responds to the heat generated by the HGM, the HGM responds to a signal received by the receiving node, and the remote sensor node is communicatively coupled to the receiving node, such that the receiving node responds to the signal received by the remote sensor node. The housing is at least partially positioned over the first sensor, and the remote sensor node includes a second sensor configured to receive the signal.

According to a second embodiment, a trigger device is coupled to a camera having a sensor. The trigger device includes a heat generating member (HGM) disposed adjacent to the sensor in thermodynamic communication therewith, and a receiving node communicatively coupled to the HGM. The HGM is configured to respond to a signal received by the receiving node, and the sensor is configured to respond to heat generated by the HGM, thereby triggering the camera to take a photograph.

According to a third embodiment, a method of remotely triggering a camera system includes detecting a signal at a receiving node via a remote sensor node. In response to detecting the signal, a heat generating member (HGM) disposed over a sensor of a camera is heated. In response to heating the HGM, the camera is triggered to take a photograph via the sensor disposed on the camera.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

This disclosure presents an apparatus and method for an externally attachable triggering device for a camera, such as, for example, a trail camera, a security camera, a game camera or other types of cameras, or any passive infrared triggered device. Sensors, including optical and/or thermal sensors, for example, may be implemented as the detection or triggering mechanism for taking photos or initiating video recordings in such cameras. The cameras are capable of taking high quality photos or videos at distances from a few feet to hundreds of yards and sometimes even further. The sensors used to initiate or otherwise trigger the cameras, however, may have significantly shorter range limitations. For example, infrared sensors may be limited to typically twenty yards or less. Sensors, such as infrared sensors, may have a fixed side to side detection range that is less than the side to side field of view of the camera. This reduced effective field of view of the sensor limits the useful range of the camera. A person/animal/vehicle (PAV) crossing the camera field of view but outside of the detection range of the sensor will not be photographed due to this limitation.

In addition, many cameras also have a field of view and detection range that are not matched from side to side. When the detecting range is wider than the camera field of view, a camera can be trigged but it will not capture the image. When the camera's field of view is wider than the detecting range, potential useful photos and/or videos outside of the detection range will not be captured.

Oftentimes, passive infrared (PIR) sensors rely on a temperature differential and movement between the environmental temperature and the PAV encroaching on the monitored area. If this PAV is the same or close to the same temperature as the environmental temperature, the PIR sensor will not detect this movement. Similarly, the PIR sensor will not be triggered if the PAV is not moving. For example, in hunting situations when it is desirable to initiate a photo of an animal that is in the field of view of the camera and within PIR detection range but it is standing still or is not large enough to trigger the PIR sensor, the sensor will not be triggered.

Various systems, devices, and methods are provided to address these challenges. For example, in the present case, an externally attachable camera triggering device may be secured to a camera (e.g., an accessory for an existing camera) and operable to trigger the camera's PIR sensor. According to some embodiments, the device includes a housing that attaches to or is otherwise positioned externally over the PIR sensor window on an existing camera system. The triggering device communicates with one or more sensors, which may be remote or external sensors, that are strategically positioned to take full advantage of a camera's field of view and trigger the camera's on-board PIR sensor in response to a signal received from the one or more sensors. According to some embodiments, the triggering device also includes a remote control/activation means to facilitate triggering of the camera on-demand and otherwise in response to a user input. Advantageously, the triggering device increases the useful range of PIR triggered camera devices, increases the reliability of triggering the PIR camera device for all temperature ranges, and provides a remote triggering feature for PIR triggered camera devices without modifications to the camera. In addition, the device allows the camera to be mounted at various heights, such as in a tree, in order to minimize detection or tampering, while also allowing the remote sensor to be located in optimal locations that are lower or closer to the target for target detection.

Advantageously, the device would also allow the camera to be placed in locations near objects that could move in the wind (e.g., bushes and tree branches). Typically these locations cause false alarms but keep the cameras hidden. When using the present triggering device, the camera can be more effectively hidden, leaving only a small opening for the camera lens and flash since the external trigger would not be affected by the local moving objects near the camera. Lastly, having the camera farther away from the area of interest allows for an increased field of view (FOV) thereby requiring fewer cameras to cover the same area. This is not possible without a remote triggering capability.

In the description which follows, like parts are marked throughout the specification and drawings with the same reference numerals, respectively. The drawings are not necessarily to scale and certain features may be shown exaggerated in scale or in somewhat schematic form in the interest of clarity and conciseness.

Figure 1:
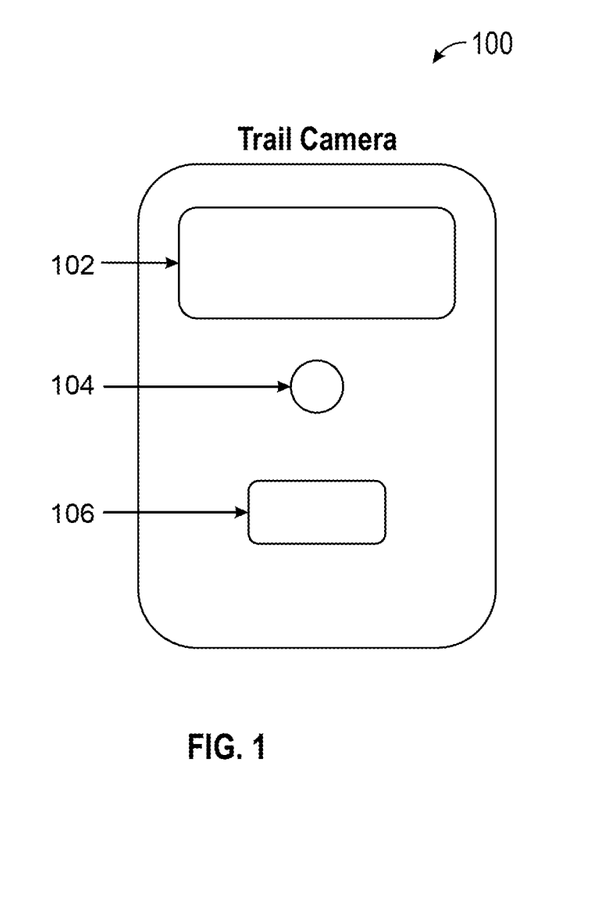
FIG. 1 is an illustration of a camera having a flash, a lens, and a sensor, according to an exemplary embodiment.
Figure 2:
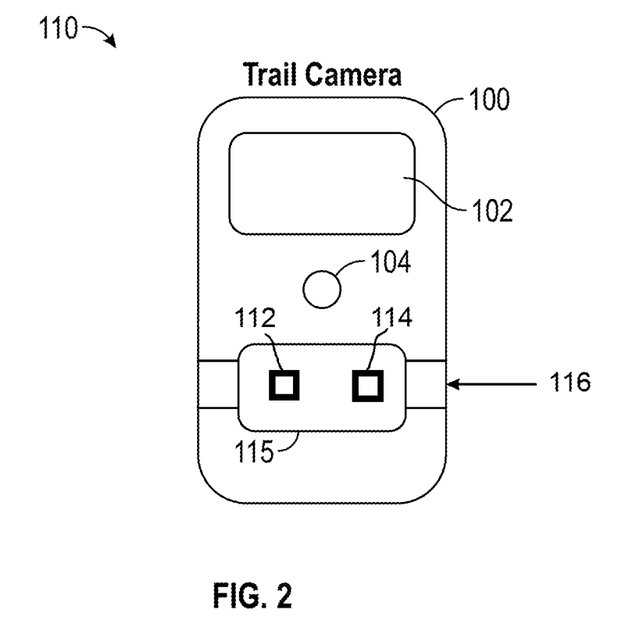
FIGS. 2 and 3 are illustrations of a trigger device used with the camera of FIG. 1, according to an exemplary embodiment.
Figure 3:
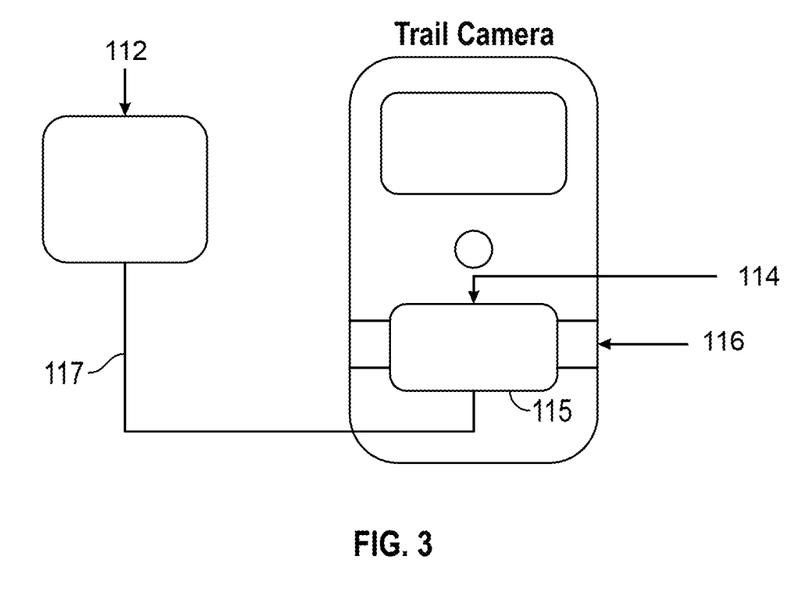

Referring now to FIGS. 1-3, a camera 100 is provided in which an externally attachable triggering device 110 is employed to advantage. Referring to specifically to FIG. 1, the camera 100 may be a security camera, a trail camera, a game camera and/or any other camera or recording device that is triggered by one or more sensors. The camera 100 includes an infrared (IR) flash or other visible or non-visible light source 102, a lens 104, and a sensor 106 to detect movement. According to some embodiments, the sensor 106 may be a passive infrared (PIR) sensor, an infrared sensor, a seismic sensor, a magnetometer sensor, a radar or other sensing device. In operation, the sensor 106 is operable to receive a signal such that when received, the camera 100 and flash 102 are triggered. As used herein, a signal may comprise radiant and/or reflected energy representative of a presence of a PAV. The signal may be received from an animal, a human, a vehicle, or any other moving objects desired to be photographed or otherwise recorded. In various embodiments, more than one sensor 106 may be used.

According to some embodiments, the camera 100 may include a PIR sensor that can be updated or otherwise retrofitted via the trigger device 110 to interface and use with different sensor types in order to the trigger the existing PIR sensor. For example, a PIR motion sensor system in an office could be retrofitted with a trigger device such that the PIR sensor now functions as a seismic, acoustic, magnetic, or other type of sensor using the systems built in PIR sensor as the trigger. Thus, an intermediate sensor may detect one type of energy, such as visible light, indicating presence of a PAV, and may generate a different type of energy, such as heat and/or infrared energy, which triggers a PIR sensor.

Referring specifically to FIGS. 2 and 3, a trigger device 110 is configured to mount over, in front of, or otherwise proximate to the sensor 106 of the camera 100 (or other device utilizing a sensor). In use, the trigger device 110 is used to trigger the camera 100 via the sensor 106 that is built into or otherwise a part of the camera 100. In the embodiment illustrated in FIGS. 2 and 3, the trigger device 110 includes a receiving node 112 and a heat generating member (HGM) 114, such as, for example, a resistor, as further described below. In various embodiments, the receiving node 112 and/or the HGM 114 may be formed to fit inside or partially inside the opening of the sensor 106. As previously mentioned, the HGM 114 can be a resistor or other device that can generate heat when, for example, an electrical current is applied. The HGM 114 may include other heating components such as a wire filament, a heat-generating diode, an infrared light generating device, such as a light emitting diode, or any other device that can generate or emit heat. In operation, the generated heat is sensed by the sensor 106 within the camera 100, which in turn is operable to trigger the camera 100 (e.g., cause the camera to take a picture or begin recording a video). As such and according to some embodiments disclosed herein, the sensor 106 is in thermodynamic communication with the HGM 114.

According to some embodiments, the trigger device 110 includes a housing 115 sized and otherwise configured to house one or both of the receiving node 112 and the HGM 114. The housing 115 may be any enclosure or other structured sized and shaped to receive and/or support the receiving node 112 and the HGM 114 and attach to or be positioned adjacent to the sensor 106. For example, as illustrated in FIG. 2, the receiving node 112 and the HGM 114 are disposed within the housing 115 such that the housing is a self-contained unit. In some embodiments, the housing 115 is insulated to enable the HGM 114 to effectively generate and/or emit heat to create the needed temperature differential to trigger the camera's PIR sensor 106. According to some embodiments, the housing 115 may be attached to the camera 100 via a strap 116, although other methods of attachment can be used. For example, the housing 115 can be attached via an adhesive, a clip, hook and loop fasteners, snaps, RTV silicone, magnets, and any other mechanical attachment type.

According to some embodiments, the receiving node 112 and the HGM 114 can be mounted to the camera 100 as separate components. For example, in FIG. 3, the receiving node 112 may be in a separate housing remote from the housing 115 that contains the HGM 114. In such a configuration, the receiving node 112 may be communicatively coupled to the HGM 114 via a connector 117, such as, for example, a cable, a radio connection, an optical connection, or any other operative connection configured (either wired or wireless) to facilitate electronic communication. In this cabled approach, an optional additional sensor could be located on either the receiving node 112 or the housing of the HGM 114.

In the embodiment illustrated in FIGS. 2 and 3, the housing 115, and thus, the HGM 114, is placed over the camera sensor 106. For example, in some embodiments, the housing 115 completely covers the sensor 106 ensuring that the sensor 106 will not trigger and take a photo or begin recording by as a result of normal operation from the sensor 106.

According to some embodiments, more than one HGM 114 may be used. For example, in the embodiment illustrated in FIGS. 4 and 5, two HGMs 114 are utilized. The HGMs 114 may be turned on (e.g., activated, heated, etc.) in sequence for to obtain a more reliable and consistent trigger. Additionally, a circuit board may be provided to a remote trigger housing and a second resistor. In operation, when power is applied to the circuit board, it is configured to turn on a resistor for 1.1 seconds before turning off. The circuit board is then configured to turn on the second resistor for 1.1 seconds before turning off. Further and by way of example, a 3 ohm resistor powered with 3 Volts DC for two seconds may be used. In other embodiments, the resistor may have a different value or be heated for different lengths of time and/or or multiple HGMs 114 may be used. It will be understood that these time durations are merely exemplary and can be longer or shorter in duration. In operation, the sensor 106 monitors temperature changes between the background and PAV, thus, the use of multiple HGMs 114 may be advantageous. By providing the heat source through the different, spaced apart HGMs 114 and at different, at least partially non-overlapping times, the sensors 106 register (e.g., senses) that the heat source is moving through the field of view of the sensor 106 simulating movement of a PAV. A circuit board may be provided to perform the switching task between the resistors. In some embodiments, the receiver node hardware may perform the task using a microcontroller instead of a dedicated hardware circuit board. Using the external circuit board to sequence the HGMs 114, 3 Volts is provided and the camera 100 is triggered.

Additionally, heating the HGM 114 quickly may effectively and better trigger the camera. For example, according to some embodiments, the system may apply 3 volts to a 3 Ohm resistor for 2 seconds. To effectively and quickly heat the HGM 114, a low wattage ¼ watt resistor may be used. In various embodiments, a higher wattage (e.g., 2 watt) resistor may be used. At 3 volts, the 3 ohm resistor dissipates 3 watts, which is above the ¼ watt power rating of the resistor. To prevent damage to the HGM 114, software (which may be embedded software on the circuit board or a hardware timer circuit) may be used to ensure (i) the HGM 114 does not remain activated for more than 2 second and (ii) a short 3-10 second rest interval occurs in between triggers. Because the HGM 114 consumes more power than the microcontroller 132 can provide, a HGM power switch 136 is provided to switch power to the HGM 114. In some embodiments, the HGM power switch 136 is a MOSFET, a transistor, or a relay. The HGM power switch 136 is controlled by the microcontroller 132.

Figure 4:
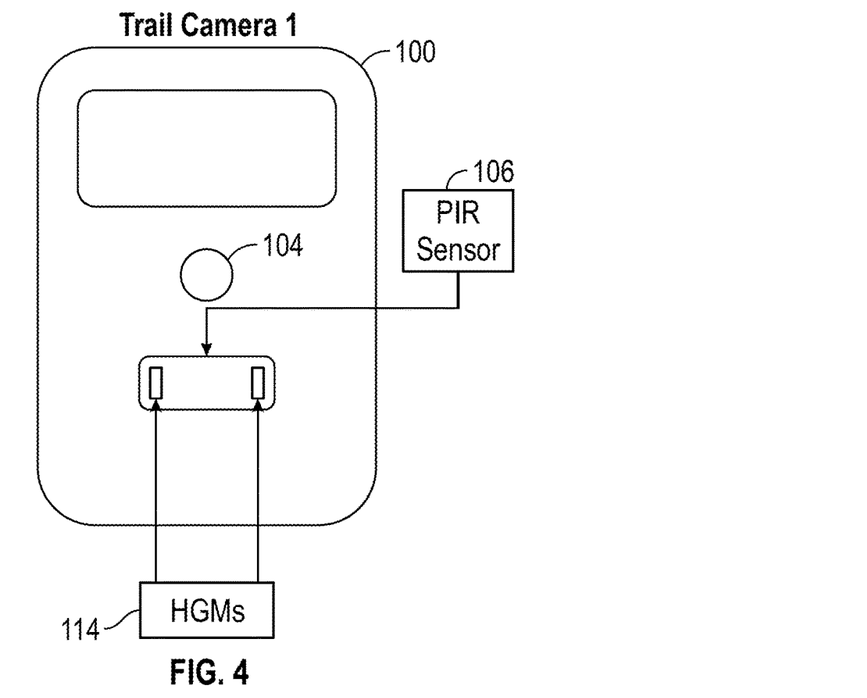
FIGS. 4 and 5 are illustrations of a heat generating member of the trigger device of FIGS. 2 and 3, according to an exemplary embodiment.
Figure 5:
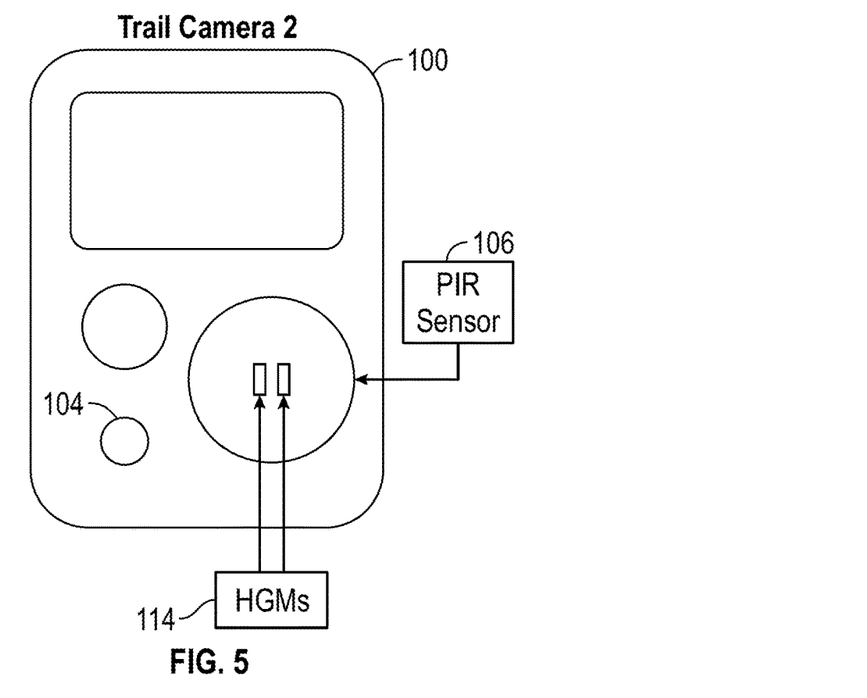
Figure 10:
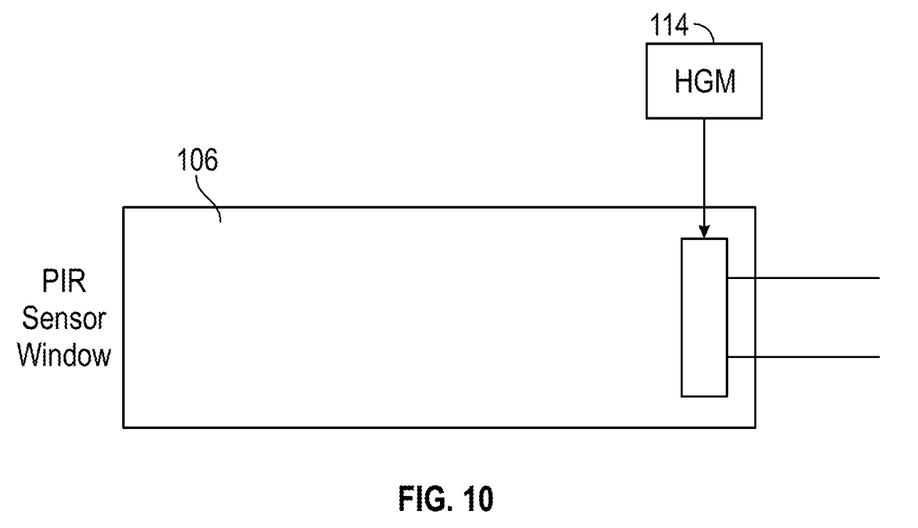
FIG. 10 is an illustration of a heat generating member of the trigger device of FIGS. 2 and 3, according to an exemplary embodiment

Further, various camera models may require the HGM 114 elements in different locations for the trigger to function. Referring still to FIGS. 4 and 5, the HGMs 114 are located on two cameras 100. A rubber-like material, which is molded to fit against the sensor 106, may be implemented. The HGMs 114 may be mounted near the edges of the sensor 106, such that the HGMs are on opposite ends of the sensor 106, equally spaced away from the center of the sensor 106, and closer to an edge than the center. In embodiments utilizing a single HGM 114, it may be advantageous to position the HGM at the edge of the sensor 106, as shown for example, in FIG. 10. In addition to varying the respective locations of the HGMs 114, the distance from the sensor 106 may vary. For example, the HGMs 114 for camera 100 illustrated in FIG. 4 are located in close proximity to the sensor 106. In some embodiments, the HGMs 114 may be directly in the center of the sensor 106 and may be approximately ¼ inch away from the lens 104 of the camera 100 so as not to block or otherwise impede the area being photographed or recorded. A mount (e.g., a Lexan or other plastic mount or a metal mount) may be used for the remote trigger circuit board that can be screwed to the camera 100 housing, thus eliminating the need for the strap 116. For instance, adhesive nuts to allow the thumb screws in the housing to attach to the camera housing may be used.

Figure 6:
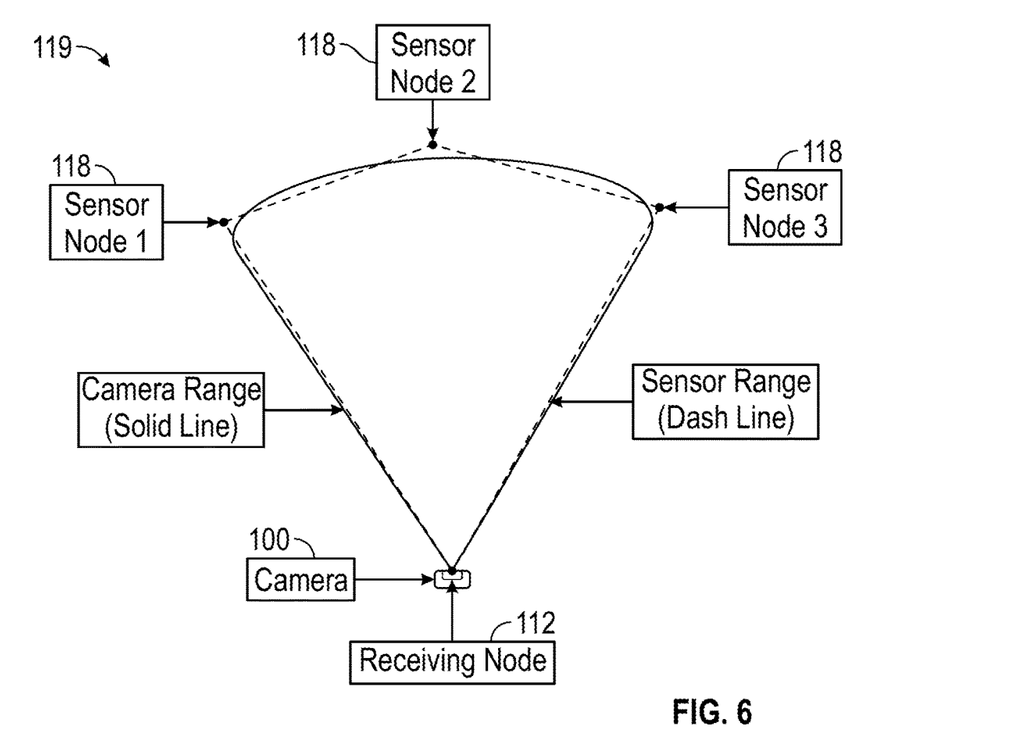
FIGS. 6 and 7 are illustrations of aspects of a sensor system, according to an exemplary embodiment.
Figure 7:
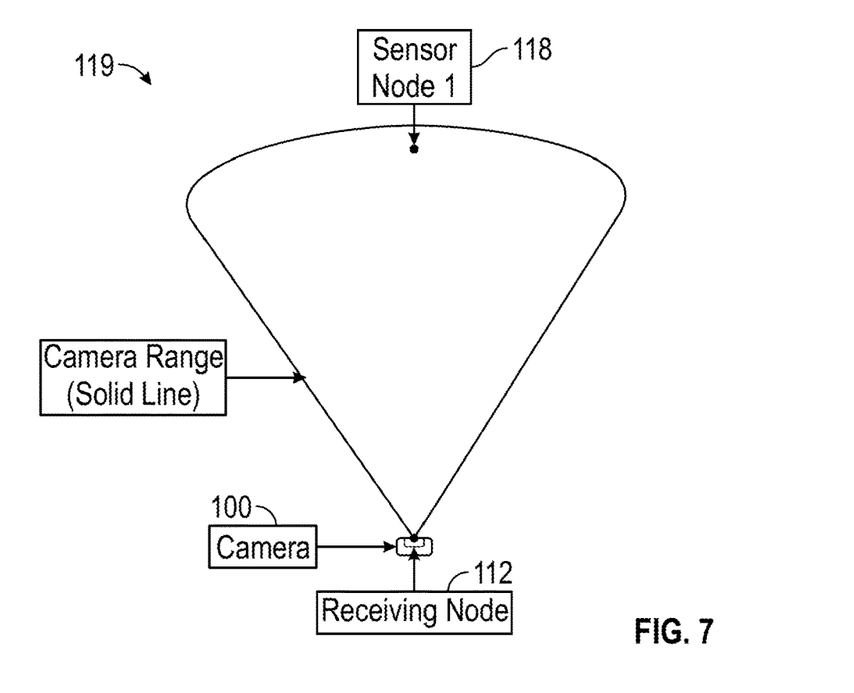

Referring now to FIGS. 6 and 7, a sensor system 119 is shown. The trigger device 110 can be remotely wired to a receiving node 112 or the receiving node 112 can be directly built onto it wherein it is a remote trigger mechanism for a sensor (e.g., PIR) enabled device. The sensor system 119 consists of remote sensor nodes 118 that communicate with the receiving node 112. The receiving node 112 consists of a receiver, as explained in greater detail below, to accept signals from the remote sensor nodes 118, a processor to process this information, and a power source to provide power to the HGMs 114. According to some embodiments, the remote sensor nodes 118 use a variety of technologies such as laser, seismic, acoustic, magnetic, RF, PIR or combinations thereof to detect movement. In use, the placement of the remote sensor nodes 118 will define the area to be monitored. An example of optimizing the sensor range to match the viewing range of the camera 100 is illustrated in FIG. 6. The remote sensor nodes 118 are configured to receive a signal that is at least one of insufficient magnitude and insufficient rate of change of magnitude to be detected by the sensor 106 of the camera 100. Put another way, the remote sensor nodes 118 are configured and otherwise positioned to increase the size of the detection area in view of the limitations of the sensor 106 on the camera 100. As illustrated in FIG. 6, a first remote sensor node 118 may be placed along the left most boundary of the camera viewing area and at the far end of that boundary. A second remote sensor node 118 may be placed directly in front of the camera 100 at the far edge of the viewing area. A third remote sensor node 118 maybe be placed along the right most boundary of the viewing area of the camera and at the far end of that boundary. Additionally other nodes could be placed within the camera's viewing area.

In a simplified implementation as shown in FIG. 7, the receiving node 112 may work with a single remote sensor node 118. In this example, when single remote sensor node 118 detects a PAV, it triggers the receiving node 112 to take a picture. This is useful in applications where the camera 100 is located far from the relevant detection area, such as if the camera 100 was mounted in a tree hundreds of feet from the area of interest monitored by the remote sensor node 118.

Figure 8:
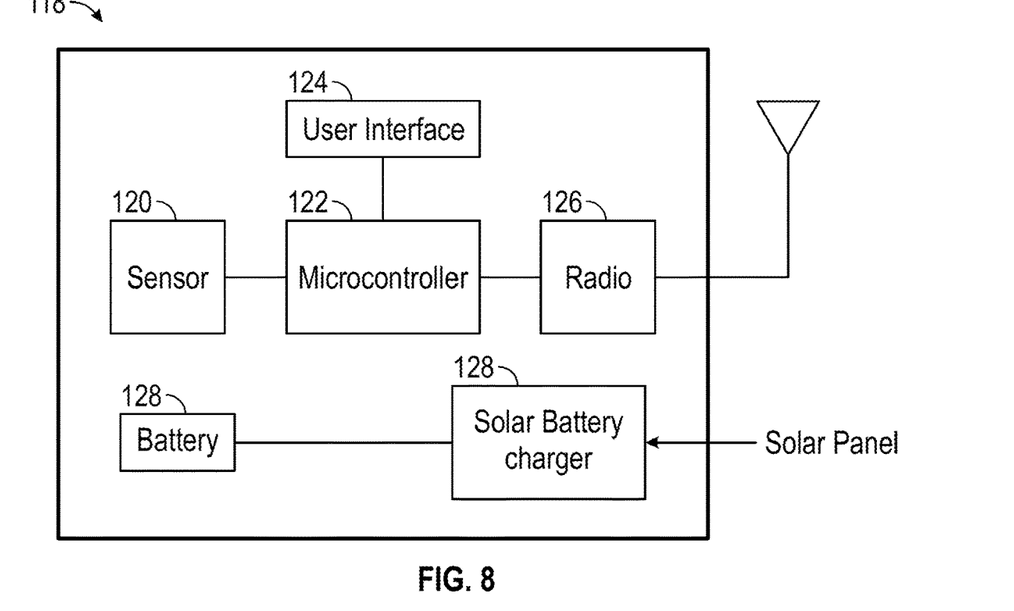
FIG. 8 is a block diagram of a remote sensor node of the sensor system of FIGS. 6 and 7, according to an exemplary embodiment.

Referring now to FIG. 8, an embodiment of a remote sensor node 118 is illustrated. Briefly, the remote sensor node 118 includes a sensor 120, a microcontroller 122, a user interface 124, a radio 126, and a power source 128 (e.g., a battery, a solar battery charger, and/or a solar panel). The sensor 120 includes any type of sensing mechanism and serves as the mechanism to communicate with the receiving node 112 to trigger and/or otherwise operate the camera 100 via the built-in sensor 106 of camera 100. In particular, in response to a detection event by the sensor 120, the microcontroller 122 is operable to send (via a wired or wireless connection) a command to the receiving node 112 to trigger the camera 100 to take a picture. As previously discussed, the sensor 120 may also be an RF tripwire sensor, a seismic, acoustic, laser, radar, magnetic, or other type of sensor. In some embodiments, such as those that include an RF tripwire system, the remote sensor node 118 may use a radio as a sensor. In addition, it should be understood that a 2.4 GHz wireless interface may be used to communicate between the remote sensor node 118 and the receiving node 112. In general, any wireless interface will work such as 433 MHz, 800 MHz or 900 MHz of any modulation scheme as desired. For example, various frequency-hopping spread spectrum (FHSS) modulation schemes may be implemented. Additionally, the communication could be done with wired connections or IR light transmission using a protocol such as IRDA.

According to some embodiments, the user interface 124 enables a user to pair and configure which sensor nodes trigger which cameras. The user interface 124 may include a plurality of buttons, LEDs, a display, rotary switches, SD card, a serial, and/or a USB interface. Additionally, according to some embodiments, the sensor 120 can be replaced with a simple pushbutton or a set of inputs to allow the user to selectively trigger the camera 100.

In addition, a clock may be used as a sensor to simultaneously trigger multiple cameras to monitor activity at given time intervals in a defined viewing area. For example, multiple cameras and a clock-based trigger may be used as a means to determine wildlife population density. Moreover, various combination of types of sensors may be contemplated.

Figure 9:
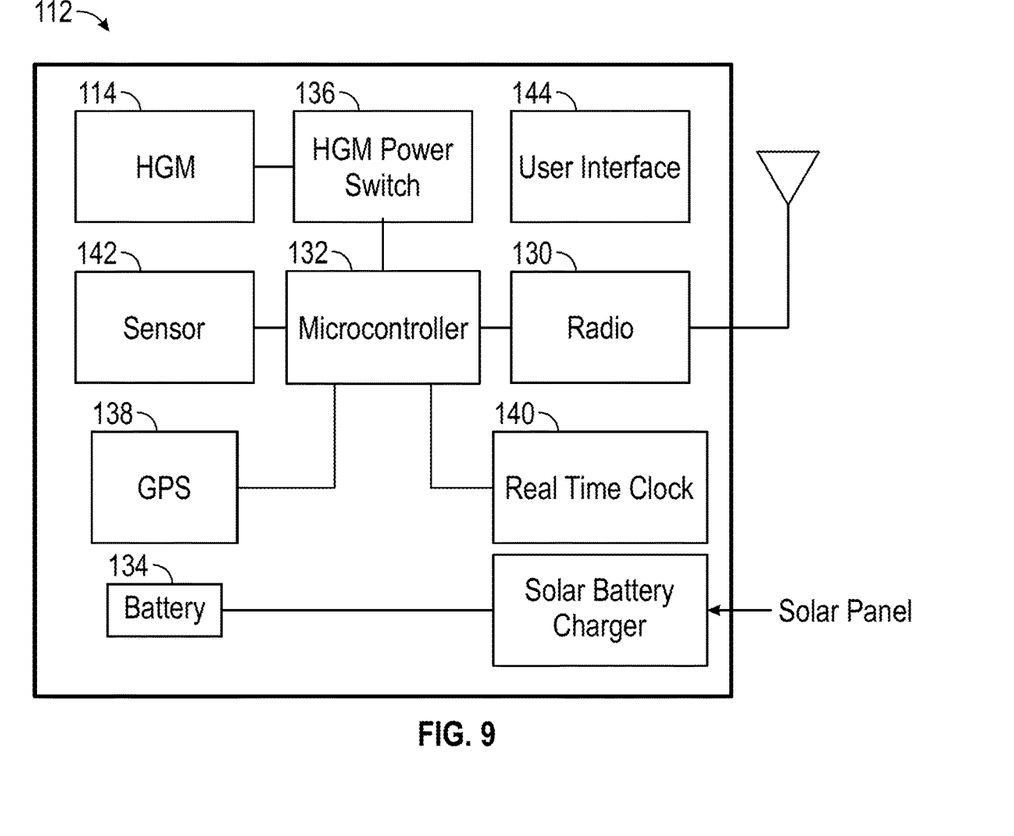
FIG. 9 a block diagram of a receiving node of the sensor system of FIGS. 6 and 7, according to an exemplary embodiment.

Referring now to FIG. 9, a receiving node 112 is illustrated. The receiving node 112 includes a radio 130, a microcontroller 132, a power source 134 (e.g., a battery, a solar battery charger, and/or a solar panel), an HGM power switch 136, and an HGM 114. Further, the receiving node 112 may include a global positioning system (GPS) 138, a Real Time Clock (RTC) 140, and a user interface 144. As previously discussed, the receiving node 112 is wirelessly connected to the remote sensor node 118; however, it should be understood that a wired connection may also be used. When a detection event occurs at the remote sensor node 118, the remote sensor node 118 sends a wireless message to the receiving node 112 commanding the camera to take a picture or start recording. Once commanded, the HGM 114 is heated for a predetermined length of time, as previously discussed to trigger the camera 100 to take a picture or begin recording.

The receiving node 112, may, in some embodiments, also include a sensor 142 to enable the receiving node 112 to be triggered locally. For example, the camera 100 may be triggered from the remote sensor nodes 118 as well as locally by a PIR sensor on the receiving node 112. Although the receiving node 112 may cover the camera's existing sensor 106 preventing it from detecting movement, the same sensor information from the sensor node may apply, including the use of a wired pushbutton or electrical contacts to trigger the camera 100. Additionally, multiple cameras 100 may be time synchronized. For instance, a sensor node 118 may be set up to send a message to multiple receiving nodes 112 to take a picture. Alternatively, the GPS 138 and the RTC 140 may be incorporated as time sensors. The user may schedule a time or set a time interval for the pictures to be taken. It should be understood that a time stamp provided by the GPS 138 may be used to set the RTC 140.

Figure 11:
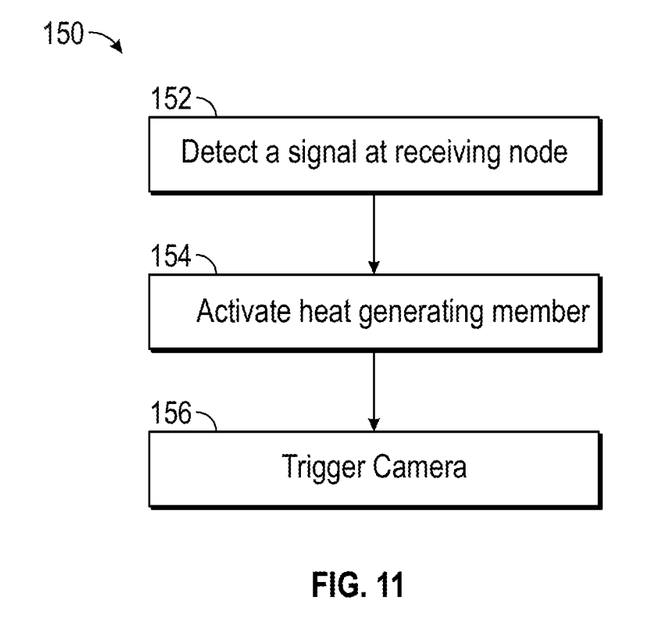
FIG. 11 is a flow chart illustrating a method of using the sensor system, according to an exemplary embodiment.

Referring now to FIG. 11, a method 150 of using a sensor system 119 is shown. At step 152, a signal is detected at a receiving node 112 via a remote sensor node 118. In some embodiments, the signal may be detected locally at a camera sensor 106. In response to detecting the signal at the receiving node 112, a HGM 114 disposed over the camera sensor 106 is activated (e.g., heated) at step 154. In response to heating the HGM, the camera 100 is triggered to take a photograph via the sensor 106. In some embodiments, there may be a plurality of HGMs 114 controlled via a circuit board. The circuit card is configured to control the plurality of HGMs 114 such that activation between the plurality of HGMs 114 may be delayed. In some embodiments, the sensor systems 119 may include a plurality of cameras. The plurality of cameras 100 may be coupled to a plurality of clocks configured to signal the cameras based on a predefined time interval, thus triggering the plurality of cameras to take photographs.

Although embodiments of the trigger device 110 and the sensor system 119 have been described in detail, those skilled in the art will also recognize that various substitutions and modifications may be made without departing from the scope and spirit of the appended claims.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes some embodiments of the disclosure, and alterations, modifications, additions and/or changes can be made thereto without departing from the scope and spirit of the disclosed embodiments, the embodiments being illustrative and not restrictive.

Furthermore, the disclosure is not to be limited to the illustrated implementations, but to the contrary, is intended to cover various modifications and equivalent arrangements included within the spirit and scope of the disclosure. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A sensor system comprising:
   a camera having a first sensor comprising a passive infrared (PIR) sensor configured to trigger the camera to take a photograph;
   a trigger device having an insulated housing, the insulated housing configured to couple to the camera to completely cover the PIR sensor, the trigger device including:

a heat generating member (HGM) disposed adjacent to the first sensor, wherein the first sensor responds to a temperature differential created by the heat generated by the HGM, and a receiving node communicatively coupled to the HGM, wherein the HGM responds to an HGM signal received from the receiving node; and a remote sensor node communicatively coupled to the receiving node, the remote sensor node configured to automatically generate a remote signal when the remote sensor node senses a movement, wherein the receiving node responds to the remote signal to generate the HGM signal.

2. The sensor system of claim 1, wherein the insulated housing is configured to enable the HGM to generate the temperature differential.

3. The sensor system of claim 2, wherein the remote sensor node and the receiving node each include a microcontroller.

4. The sensor system of claim 1, wherein the trigger device is coupled to the camera with at least one of a strap an adhesive, a clip, a snap, RTV silicone, hook and loop fasteners, a screw, or magnets.

5. The sensor system of claim 1, wherein the receiving node is molded and sized to fit at least partially inside an opening of the first sensor.

6. The sensor system of claim 1, wherein the receiving node is detached from the camera, such that HGM is coupled to the camera and the receiving node is communicatively coupled to the HGM via a cable.

7. The sensor system of claim 1, further comprising a plurality of HGMs.

8. The sensor system of claim 7, further comprising a circuit card, wherein the circuit card is configured to control the plurality of HGMs.

9. The sensor system of claim 1, further comprising a plurality of remote sensor nodes positioned along a field of view of the camera.

10. The sensor system of claim 1, wherein the receiving node responds to a signal generated by a second sensor at least one of inside or adjacent to the receiving node.

11. A trigger device coupled to a passive infrared (PIR) sensor, the trigger device comprising:

a heat generating member (HGM) disposed adjacent to the PIR sensor and in thermodynamic communication therewith, the HGM positioned within an insulated housing that is positioned to completely cover the PIR sensor;

a receiving node communicatively coupled to the HGM, the HGM configured to respond to a signal received by the receiving node, wherein the PIR sensor is configured to respond to a temperature differential created by the heat generated by the HGM and trigger the sensor to output an output signal;

wherein the insulated housing is configured to enable the HGM to generate the temperature differential; and wherein the signal received by the receiving node is generated by a remote sensor node communicatively coupled to the receiving node, the remote sensor node configured to automatically generate the signal when the remote sensor node is senses a movement.

12. The trigger device of claim 11, wherein the insulated housing is configured to enable the HGM to generate the temperature differential.

13. The trigger device of claim 11, wherein the receiving node is detached from the PIR sensor, such that HGM is coupled to the PIR sensor and the receiving node is communicatively coupled to the HGM via a cable.

14. The trigger device of claim 11, further comprising a plurality of HGMs.

15. The trigger device of claim 14, further comprising a circuit card, wherein the circuit card is configured to control the plurality of HGMs.

16. The trigger device of claim 11, further comprising a local sensor at least one of inside or adjacent to the receiving node, wherein the HGM is configured to respond to a signal received by the local sensor.

17. A method of remotely triggering a sensor system comprising:

detecting a movement signal at a remote sensor node;

in response to the remote sensor node detecting the movement signal, generating a trigger signal automatically via the remote sensor node;

detecting the trigger signal at a receiving node;

in response to detecting the trigger signal, heating a heat generating member (HGM) disposed within an insulated housing, the insulated housing is disposed to completely cover a sensor; and in response to sensing the temperature differential generated by the HGM, triggering the sensor to output an output signal, wherein the movement signal detected at the remote sensor node is at least one of an insufficient magnitude or an insufficient rate of change of magnitude to be detected by the sensor and trigger the sensor.

18. The method of claim 17, further comprising controlling a plurality of HGMs via a circuit card, wherein the circuit card is configured to control the plurality of HGMs, wherein activation between the plurality of HGMs is delayed.

19. The method of claim 17, further comprising detecting a signal at the receiving node locally by a passive infrared (PIR) sensor local sensor that is positioned at least one of inside or adjacent to the receiving node.

20. The method of claim 17, further comprising periodically heating the HGM in response to a predetermined time to trigger the sensor.

* * * * *